US008690105B2

(12) United States Patent
Liao

(10) Patent No.: US 8,690,105 B2
(45) Date of Patent: Apr. 8, 2014

(54) PARACHUTE

(76) Inventor: Shueh-Chih Liao, Taichung (TW)

( * ) Notice: Subject to any disclaimer, the term of this patent is extended or adjusted under 35 U.S.C. 154(b) by 0 days.

(21) Appl. No.: 13/619,987

(22) Filed: Sep. 14, 2012

(65) Prior Publication Data

US 2014/0021301 A1    Jan. 23, 2014

(30) Foreign Application Priority Data

Jul. 20, 2012  (TW) .............................. 101126191 A

(51) Int. Cl.
*B64D 17/00* (2006.01)
*B64D 17/04* (2006.01)
*B64D 17/14* (2006.01)

(52) U.S. Cl.
USPC ............................ 244/142; 244/145; 244/149

(58) Field of Classification Search
USPC .......................................... 244/142, 145, 149
See application file for complete search history.

(56) References Cited

U.S. PATENT DOCUMENTS

| | | | | | |
|---|---|---|---|---|---|
| 1,185,537 | A | * | 5/1916 | Raffa | 244/142 |
| 1,802,325 | A | * | 4/1931 | Broadwick | 244/142 |
| 1,803,903 | A | * | 5/1931 | Jenezon | 244/139 |
| 1,859,155 | A | * | 5/1932 | Owens | 244/149 |
| 2,117,319 | A | * | 5/1938 | Hart | 244/145 |
| 3,251,566 | A | * | 5/1966 | Chappell | 244/31 |
| 3,385,539 | A | * | 5/1968 | Ewing et al. | 244/142 |
| 3,434,680 | A | * | 3/1969 | Ferguson | 244/142 |
| 3,679,155 | A | * | 7/1972 | Centofanti | 244/32 |
| 5,388,787 | A | * | 2/1995 | Webb et al. | 244/145 |
| 5,967,459 | A | * | 10/1999 | Hayashi | 244/32 |
| 6,708,927 | B2 | * | 3/2004 | Chen | 244/143 |

* cited by examiner

*Primary Examiner* — Tien Dinh
*Assistant Examiner* — Steven Hawk

(57) ABSTRACT

A parachute can be opened automatically without requiring manual operation. In addition, the parachute is capable of staying balanced during the course of landing. The parachute comprises: a spherical canopy, an air guide member and four assistant canopies. The air guide member is a rotation symmetrical structure with respect to the central axis, each of the cylindrical members is also a rotation symmetrical structure with respect to the assistant central axis, and the assistant canopies are also symmetrically arranged with respect to the central axis, so as to maintain the parachute in a stable and balanced state when the parachute is falling.

6 Claims, 4 Drawing Sheets

PARACHUTE

BACKGROUND OF THE INVENTION

1. Field of the Invention

The present invention relates to a parachute, and more particularly to a parachute used to slow down the falling speed of a payload.

2. Description of the Prior Art

A parachute is used to slow down the falling speed and normally includes an umbrella-shaped canopy, and to the periphery of the canopy is fixed a plurality of suspension lines, and another ends of the suspensions are fixed to a parachuter. Most of the improvements made to the parachute in the past are aimed at further slowing down the falling speed by changing the shape of the parachute to increase wind drag.

It is to be noted that using the conventional parachute requires manual operation and professional skills, namely, the parachuter (the user) must be well trained before parachuting, otherwise, the parachuter might get hurt or even killed if the canopy fails to open. Therefore, a parachute which can be opened automatically was developed, so it can be used by inexperienced user. However, the parachute which can be opened automatically still has the balance problem.

The present invention has arisen to mitigate and/or obviate the afore-described disadvantages.

SUMMARY OF THE INVENTION

The primary object of the present invention is to provide a parachute which can be opened automatically without requiring manual operation. In addition, the parachute is capable of staying balanced during the course of landing.

To achieve the above object, a parachute in accordance with the present invention is used to slow down the falling speed of a payload, comprises: a spherical canopy, an air guide member and four assistant canopies. The spherical canopy includes a central axis and an air hole which is sealed with a plug. A plurality of connecting members are located around the central axis and each have one fixed at a bottom of the spherical canopy and another end fixed to the payload. The air guide member surrounds the central axis and is fixed to a periphery of the spherical parachute. The air guide member includes an annular portion and a skirt portion extending toward the bottom of the spherical canopy. Around a bottom of the annular portion are formed at least three air guide grooves, and each of the air guide grooves is formed with an air passage extending toward the top of the spherical canopy. Each of the air passages is formed at a top end thereof with an opening, around each of the air passages is disposed a cylindrical member which is in communication with the opening of the air passages, the air guide member is a rotation symmetrical structure with respect to the central axis. At least three assistant canopies are fixed in the cylindrical members by fixing members.

DETAILED DESCRIPTION OF THE PREFERRED EMBODIMENTS

Figure 1:
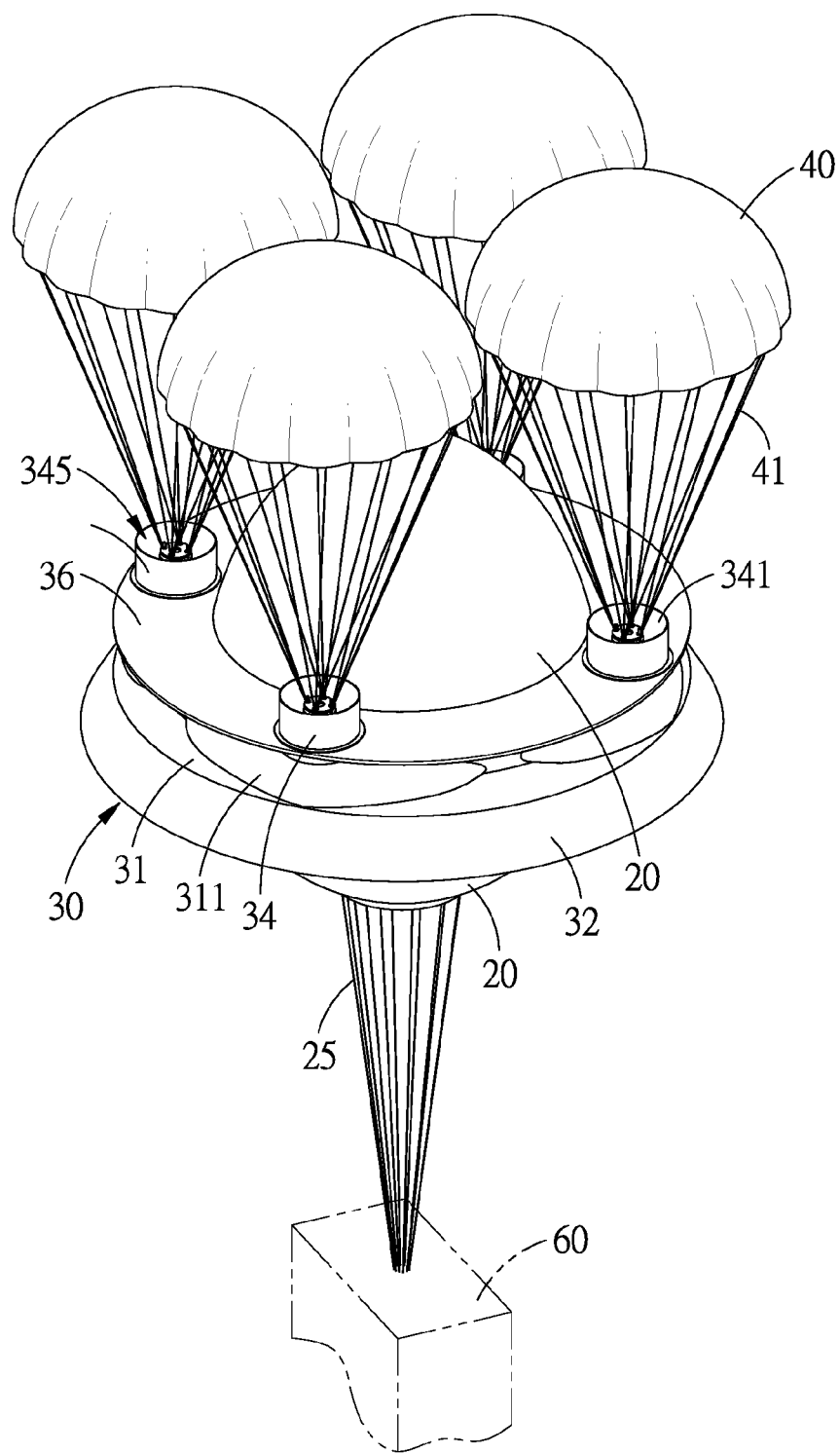
FIG. 1 is a perspective view of a parachute in accordance with a first preferred embodiment of the present invention, wherein the assistant canopies are open.

The present invention will be clearer from the following description when viewed together with the accompanying drawings, which show, for purpose of illustrations only, the preferred embodiment in accordance with the present invention.

Referring to FIGS. 1-4, a parachute in accordance with a first preferred embodiment of the present invention is used to slow down the falling speed of a payload 60 and comprises: a spherical canopy 20, an air guide member 30 and four assistant canopies 40.

The spherical canopy 20 is made of flexible composite fiber material and full of low density gas and includes a central axis a1. Inside the spherical canopy 20 is formed a passage 21 which is located along the central axis a1. The passage 21 includes a top opening 211 and a bottom opening 212 which are located at the top and bottom of the spherical canopy 20, respectively. A support rod 22 is inserted in the passage 21 and has a top clamp block 221 and a bottom clamp block 222 at both ends thereof to seal the top opening 211 and the bottom opening 212, respectively, so that the spherical canopy 20 is supported by the support rod 22 and can be prevented from distortion or deformation caused by atmospheric pressure. The support rod 22 further improves the wind pressure resistance of the spherical canopy 20. An air hole 23 penetrating the spherical canopy 20 and the bottom clamp block 222 is formed adjacent to the bottom opening 212 and sealed with a plug 24. A plurality of connecting members (in the form of nylon ropes) 25 are located around the central axis a1 and each has one fixed at the bottom of the spherical canopy 20 and another end fixed to the payload 60.

The air guide member 30 surrounds the central axis a1 and is fixed to the periphery of the spherical canopy 20. The air guide member 30 includes an annular portion 31 and a skirt portion 32 extending toward the bottom of the spherical canopy 20. Around a bottom of the annular portion 31 are formed four air guide grooves 311, and each of the air guide grooves 311 is formed with a conical air passage 33 extending toward the top of the spherical canopy 20. Each of the air passages 33 is made of flexible material and tapers upward and is formed at a top end thereof with an opening 331. Around each of the air passages 33 is disposed a cylindrical member 34 which has an assistant central axis a2 and two open ends 341. In the center of the respective cylindrical members 34 is disposed a protruding annular base 346 which defines a cylindrical chamber 347 for insertion of the air passages 33 and is in communication with the opening 331 of the air passages 33. In each of the cylindrical members 34 are further disposed a slide pillar 35, a clamp 342 and a slide block 343 in such a manner that the slide pillar 35 is inserted at the top of the annular base 346 and has a first end 351 located above the annular base 346 and a second end 352 located inside the annular base 346. The clamp 342 is provided at one thereof with a pivot point 348 which is pivoted to one end of an elastic member 344, and another end of the elastic member 344 is fixed to the second end 352 of the slide pillar 35. Another end of the clamp 342 is located around a periphery of the air passage 33, and the slide block 343 is fixed at the first end 351 of the slide pillar 35. The air guide member 30 is a rotation symmetrical structure with respect to the central axis a1, and each of the cylindrical members 34 is also a rotation symmetrical structure with respect to the assistant central axis a2. At the top of the air guide member 30 is formed a fixing ring 36 which surrounds the central axis a1 and fixed at around the periphery of the spherical canopy 20 to improve the wind pressure resistance of the spherical canopy 20, so that the spherical canopy 20 can be prevented from distortion or deformation caused by atmospheric pressure. The fixing ring 36 is formed with four mounting holes 361 for insertion of the cylindrical members 34.

The four assistant canopies 40 are fixed to the first end 351 of the respective slide pillars 35 by a fixing member 41 which is in the form of nylon lines.

What mentioned above are the structural relations of the main parts of the present invention, for a better understanding of the operation and function of the embodiment, reference should be made back to FIG. 1. When the parachute of the present invention carrying the payload 60 falls, the assistant canopies 40 will open completely, air will impact the spherical canopy 20 and the air guide member 30 to create a buoyancy effect, so as to slow down the falling speed of the payload 60. In addition, as shown in FIG. 2, when the payload 60 falls, air will be collected by the skirt portion 32 of the air guide member 30, then flow into the air passages 33 via the air guide grooves 311, and finally will flow out of the cylindrical members 34 to open the assistant canopies 40.

Figure 2:
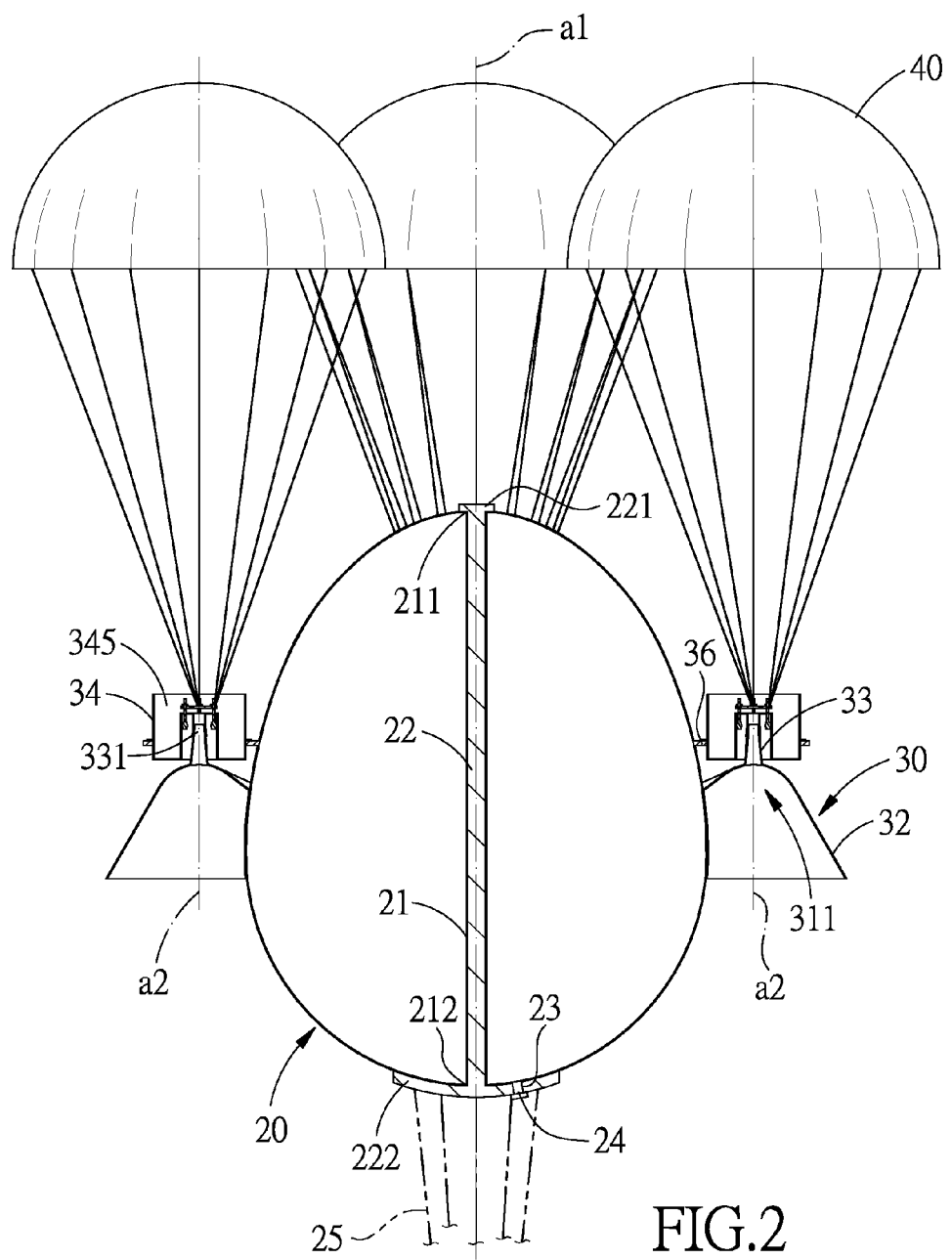
FIG. 2 is a cross sectional view of the parachute in accordance with the first preferred embodiment of the present invention.
Figure 3:
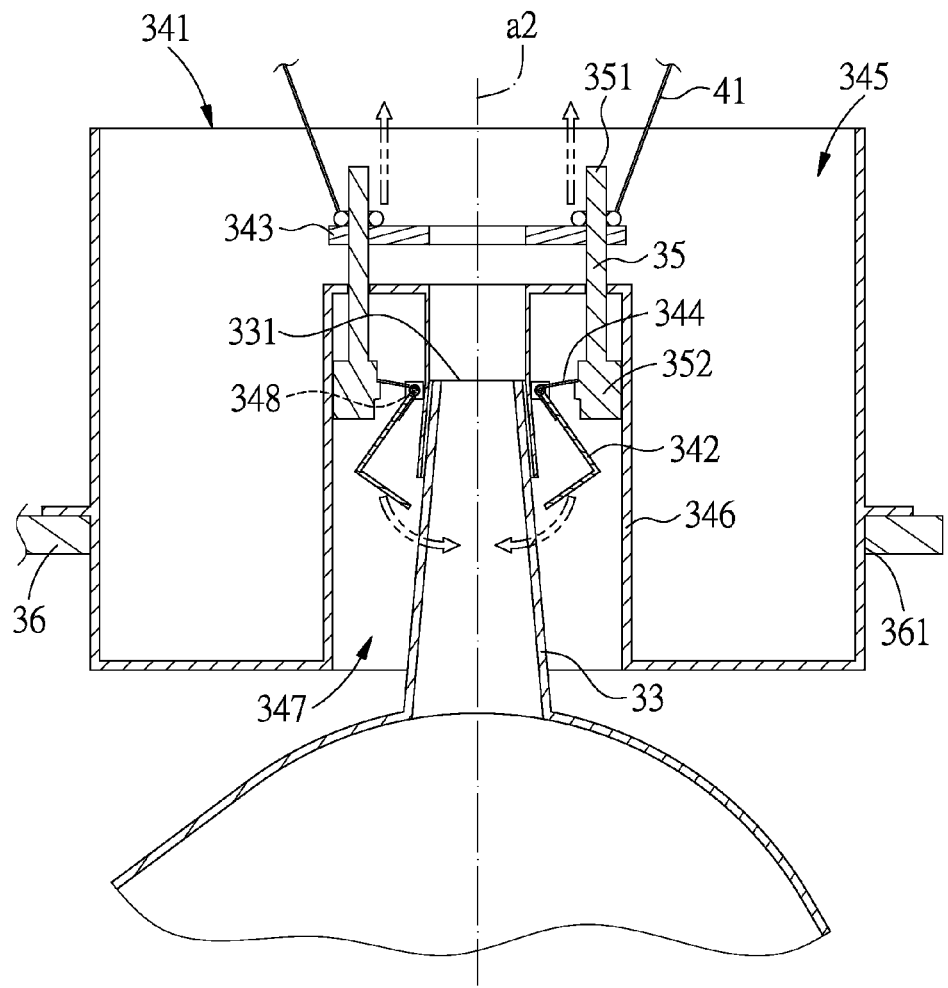
FIG. 3 is a magnified cross sectional view showing the interior of the cylindrical member of the parachute in accordance with the present invention.

It is to be noted that: as shown in FIGS. 1-3, the air guide member 30 is a rotation symmetrical structure with respect to the central axis a1, each of the cylindrical members 34 is also a rotation symmetrical structure with respect to the assistant central axis a2, and the assistant canopies 40 are also symmetrically arranged with respect to the central axis a1, so as to maintain the parachute of the present invention in a stable and balanced state when the parachute is falling. On top of that, each of the cylindrical members 34 is formed with an inner space 345, so that the assistant canopies 40, when not in use, can be folded and accommodated in the inner space 345 of the cylindrical members 34, therefore, the volume of the parachute of the present invention can be efficiently reduced. In addition, the present invention doesn't require any manual operation to open the parachute. Hence, the parachute of the present invention can also be used to safely land a non-life object, such as the payload 60.

Referring then to FIGS. 2 and 3 again, when the assistant canopy 40 opens, the first end 351 of the slide pillar 35, to which the fixing member 41 is fixed, will move upward, at this moment, the second end 352 of the slide pillar 35 will push the elastic member 344, making the clamp 342 clamp the air passage 33, so as to reduce the air passing through the air passages 33. Hence, the buoyancy of the parachute of the present invention is increased to further slow down the falling speed.

Figure 4:
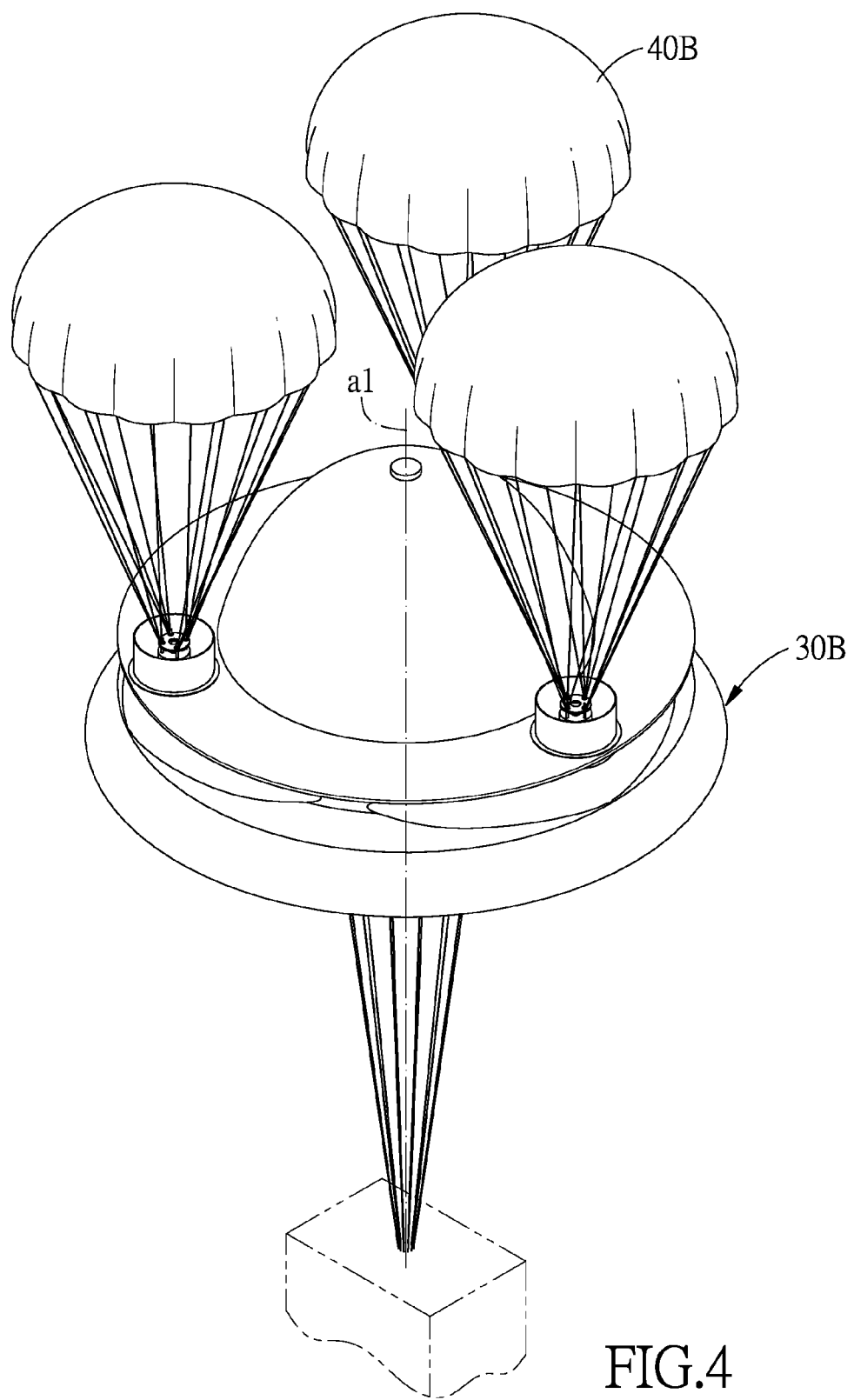
FIG. 4 is a perspective view of a parachute in accordance with a second preferred embodiment of the present invention.

As shown in FIG. 4, the parachute in accordance with a second embodiment of the present is similar to the first embodiment, expect that, there are three assistant canopies 40B on the air guide member 30B.

While we have shown and described various embodiments in accordance with the present invention, it is clear to those skilled in the art that further embodiments may be made without departing from the scope of the present invention.

What is claimed is:

1. A parachute used to slow down the falling speed of a payload, comprising:
a spherical canopy including a central axis and an air hole which is sealed with a plug, a plurality of connecting members being located around the central axis and each having one end fixed at a bottom of the spherical canopy and having another end fixed to the payload;
an air guide member surrounding the central axis and being fixed to a periphery of the spherical parachute, the air guide member including an annular portion and a skirt portion extending toward the bottom of the spherical canopy, around a bottom of the annular portion being formed at least three air guide grooves, and each of the air guide grooves being formed with an air passage extending toward the top of the spherical canopy, each of the air passages being formed at a top end thereof with an opening, around each of the air passages being disposed a cylindrical member which is in communication with the opening of the air passages, the air guide member being a rotation symmetrical structure with respect to the central axis; and
at least three assistant canopies fixed in the cylindrical members by fixing members.

2. The parachute as claimed in claim 1, wherein at the top of the air guide member is formed a fixing ring which surrounds the central axis and fixed around the periphery of the spherical canopy to improve wind pressure resistance of the spherical canopy, so that the spherical canopy is prevented from distortion or deformation caused by atmospheric pressure, the fixing ring is formed with at least three mounting holes.

3. The parachute as claimed in claim 1, wherein each of the air passages is made of flexible material, in each of the cylindrical members are disposed a slide pillar, a clamp and a slide block in such a manner that the slide pillar is inserted in the cylindrical member, the clamp has one end fixed to the second end by an elastic member and has another end located around a periphery of the air passage, and the slide block is fixed at the first end of the slide pillar.

4. The parachute as claimed in claim 3, wherein the fixing members of the assistant canopies are fixed to the first ends of the slide pillars, when air flows, the fixing members will pull upward the first ends to make the second ends push the elastic members, making the clamps clamp the air passages, so as to reduce the air passing through the air passages.

5. The parachute as claimed in claim 1, wherein in a center of the respective cylindrical members is disposed a protruding annular base which defines a cylindrical chamber for insertion of the air passages and is in communication with the opening of the air passages, in each of the cylindrical members are further disposed a slide pillar, a clamp and a slide block in such a manner that the slide pillar is inserted at a top of the annular base and has a first end located above the annular base and a second end located inside the annular base, the clamp has one end fixed to the second end by an elastic member and has another end located around a periphery of the air passage, and the slide block is fixed at the first end of the slide pillar.

6. The parachute as claimed in claim 1, wherein the spherical canopy is made of flexible material, inside the spherical canopy is formed a passage which includes a top opening and a bottom opening located at top and bottom of the spherical canopy, respectively, a support rod is inserted in the passage and has a top clamp block and a bottom clamp block at both ends thereof to seal the top opening and the bottom opening, respectively, so that the spherical canopy is supported by the support rod and prevented from distortion or deformation caused by atmospheric pressure.

* * * * *